(12) United States Patent
Campbell

(10) Patent No.: US 9,731,383 B2
(45) Date of Patent: Aug. 15, 2017

(54) FILLER METAL WITH FLUX FOR BRAZING AND SOLDERING AND METHOD OF USING SAME

(71) Applicant: Bellman-Melcor Development, LLC, Tinley Park, IL (US)

(72) Inventor: Steven Campbell, Mokena, IL (US)

(73) Assignee: Bellman-Melcor Development, LLC, Tinley Park, IL (US)

( * ) Notice: Subject to any disclaimer, the term of this patent is extended or adjusted under 35 U.S.C. 154(b) by 0 days.

(21) Appl. No.: 14/327,274

(22) Filed: Jul. 9, 2014

(65) Prior Publication Data

US 2016/0008929 A1 Jan. 14, 2016

(51) Int. Cl.
*B23K 35/02* (2006.01)
*B23K 35/40* (2006.01)

(52) U.S. Cl.
CPC ........ *B23K 35/0227* (2013.01); *B23K 35/406* (2013.01)

(58) Field of Classification Search
USPC ....................................................... 228/56.3
See application file for complete search history.

(56) References Cited

U.S. PATENT DOCUMENTS

| | | | |
|---|---|---|---|
| 400,869 A * | 4/1889 | Norton | B32B 27/08 148/24 |
| 607,504 A | 7/1898 | Crowther | |
| 1,650,905 A | 12/1925 | Mills | |
| 1,629,748 A | 5/1927 | Stoody | |
| 1,865,169 A | 7/1927 | Candy | |
| 1,968,618 A | 2/1932 | Padgett et al. | |
| 1,972,315 A | 9/1934 | Ramey | |
| 2,005,189 A | 6/1935 | Herr | |
| 2,055,276 A | 9/1936 | Brownsdon et al. | |
| 2,279,284 A | 4/1942 | Wassermann | |

(Continued)

FOREIGN PATENT DOCUMENTS

AU 4936179 A 7/1980
BE 878006 1/1980

(Continued)

OTHER PUBLICATIONS

European Search Report mailed Jun. 22, 2012 for Application No. PCT/US2006/043856.

(Continued)

*Primary Examiner* — Devang R Patel
(74) *Attorney, Agent, or Firm* — Nixon Peabody LLP

(57) ABSTRACT

A brazing or soldering wire has a pair channels recessed therein. A divider separates the pair of channels. The divider has opposing walls extending outwardly from corresponding base portions of the pair of channels. A first engagement surface is located between the opposing walls. A pair of outer walls is separated by the pair of channels and the divider. A second engagement surface is formed between an outer surface of the elongated wire and a terminal end of one of the outer walls and is substantially coplanar with the first engagement surface. A third engagement surface is formed between the outer surface of the elongated wire and a terminal end of the other of the outer walls and is substantially coplanar with the first engagement surface. A cured flux solution is located within the pair of channels.

12 Claims, 14 Drawing Sheets

(56) References Cited

U.S. PATENT DOCUMENTS

| | | | |
|---|---|---|---|
| 2,442,087 A | 5/1948 | Kennedy | |
| 2,465,503 A | 3/1949 | Woods | |
| 2,499,641 A | 3/1950 | Goody | |
| 2,565,477 A * | 8/1951 | Crowell | B23K 35/406 |
| | | | 118/44 |
| 2,785,285 A | 3/1957 | Bernard | |
| 2,927,043 A | 3/1960 | Stetson | |
| 2,958,941 A * | 11/1960 | Goerg, Sr. | B23K 1/203 |
| | | | 228/224 |
| 3,033,713 A | 5/1962 | Bielenberg et al. | |
| 3,051,822 A | 8/1962 | Bernard et al. | |
| 3,077,131 A | 2/1963 | McShane | |
| 3,162,551 A | 12/1964 | Short | |
| 3,198,560 A | 8/1965 | Collins | |
| 3,239,125 A | 3/1966 | Sherlock | |
| 3,245,141 A | 4/1966 | Gruetjen | |
| 3,290,772 A | 12/1966 | Crouch | |
| 3,318,729 A | 5/1967 | Siegle et al. | |
| 3,365,565 A | 1/1968 | Claussen | |
| 3,452,419 A | 7/1969 | Hillert | |
| 3,534,390 A | 10/1970 | Woods et al. | |
| 3,542,998 A | 11/1970 | Huff | |
| 3,555,240 A | 1/1971 | Gloor et al. | |
| 3,558,851 A | 1/1971 | *Cku | |
| 3,610,663 A | 10/1971 | Lago | |
| 3,619,429 A | 11/1971 | Torigai et al. | |
| 3,620,830 A | 11/1971 | Kramer | |
| 3,620,869 A | 11/1971 | Stump et al. | |
| 3,639,721 A | 2/1972 | Hubbel | |
| 3,642,998 A | 2/1972 | Jennings | |
| 3,688,967 A | 9/1972 | Arikawa et al. | |
| 3,695,795 A | 10/1972 | Jossick | |
| 3,703,254 A | 11/1972 | Maierson et al. | |
| 3,745,644 A | 7/1973 | Moyer et al. | |
| 3,935,414 A | 1/1976 | Ballass et al. | |
| 3,967,036 A | 6/1976 | Sadowski | |
| 3,980,859 A | 9/1976 | Leonard | |
| 4,041,274 A | 8/1977 | Sadowski | |
| 4,121,750 A | 10/1978 | Schoer et al. | |
| 4,134,196 A | 1/1979 | Yamaji et al. | |
| 4,174,962 A | 11/1979 | Frantzreb, Sr. et al. | |
| 4,214,145 A | 7/1980 | Zvanut et al. | |
| 4,301,211 A | 11/1981 | Sloboda | |
| 4,379,811 A | 4/1983 | Puschner et al. | |
| 4,396,822 A | 8/1983 | Kishida et al. | |
| 4,430,122 A | 2/1984 | Pauga | |
| 4,447,472 A | 5/1984 | Minnick et al. | |
| 4,493,738 A | 1/1985 | Collier et al. | |
| 4,497,849 A | 2/1985 | Hughes et al. | |
| 4,571,352 A | 2/1986 | Aoki | |
| 4,587,097 A | 5/1986 | **Rabinkin et al. | |
| 4,587,726 A | 5/1986 | Holmgren | |
| 4,624,860 A | 11/1986 | Alber et al. | |
| 4,708,897 A | 11/1987 | Douchy | |
| 4,762,674 A | 8/1988 | Cheng et al. | |
| 4,785,029 A | 11/1988 | Honma et al. | |
| 4,785,092 A | 11/1988 | Nanba et al. | |
| 4,800,131 A | 1/1989 | Marshall et al. | |
| 4,831,701 A | 5/1989 | Yutaka | |
| 4,900,895 A | 2/1990 | Marshall | |
| 4,901,909 A | 2/1990 | George | |
| 4,993,054 A | 2/1991 | Ujari | |
| 5,098,010 A | 3/1992 | Carmichael et al. | |
| 5,175,411 A | 12/1992 | Barber | |
| 5,184,767 A | 2/1993 | Estes | |
| 5,219,425 A | 6/1993 | Nishikawa et al. | |
| 5,280,971 A | 1/1994 | Tokutake et al. | |
| 5,316,206 A | 5/1994 | Syslak et al. | |
| 5,360,158 A | 11/1994 | Conn et al. | |
| 5,418,072 A | 5/1995 | Baldantoni et al. | |
| 5,575,933 A | 11/1996 | Ni | |
| 5,749,971 A | 5/1998 | Ni | |
| 5,759,707 A | 6/1998 | Belt et al. | |
| 5,781,846 A | 7/1998 | Jossick | |
| 5,791,005 A | 8/1998 | Grabowski et al. | |
| 5,806,752 A | 9/1998 | Van Evans et al. | |
| 5,820,939 A | 10/1998 | Popoola et al. | |
| 5,903,814 A | 5/1999 | Miura et al. | |
| 5,917,141 A | 6/1999 | Naquin | |
| 6,093,761 A | 7/2000 | Schofalvi | |
| 6,186,390 B1 | 2/2001 | Tadauchi et al. | |
| 6,204,316 B1 | 3/2001 | Schofalvi | |
| 6,244,397 B1 | 6/2001 | Kars | |
| 6,248,860 B1 | 6/2001 | Sant'Angelo et al. | |
| 6,264,062 B1 | 7/2001 | Lack et al. | |
| 6,277,210 B1 | 8/2001 | Schuster | |
| 6,317,913 B1 | 11/2001 | Kilmer et al. | |
| 6,344,237 B1 | 2/2002 | Kilmer et al. | |
| 6,376,585 B1 | 4/2002 | Schofalvi et al. | |
| 6,395,223 B1 | 5/2002 | Schuster et al. | |
| 6,409,074 B1 | 6/2002 | Katoh et al. | |
| 6,417,489 B1 | 7/2002 | Blankenship et al. | |
| 6,426,483 B1 | 7/2002 | Blankenship et al. | |
| 6,432,221 B1 | 8/2002 | Seseke-koyro et al. | |
| 6,497,770 B2 | 12/2002 | Watsuji et al. | |
| 6,598,782 B2 | 7/2003 | Wieres et al. | |
| 6,608,286 B2 | 8/2003 | Jiang | |
| 6,680,359 B2 | 1/2004 | Schoenheider | |
| 6,713,593 B2 | 3/2004 | Ree et al. | |
| 6,733,598 B2 | 5/2004 | Swidersky et al. | |
| 6,830,632 B1 | 12/2004 | Fuerstenau et al. | |
| 6,846,862 B2 | 1/2005 | Schofalvi et al. | |
| 6,864,346 B2 | 3/2005 | Schoenheider | |
| 6,872,465 B2 | 3/2005 | Soga et al. | |
| 6,881,278 B2 | 4/2005 | Amita et al. | |
| 6,960,260 B2 | 11/2005 | Goto | |
| 7,022,415 B2 | 4/2006 | Schnittgrund | |
| 7,267,187 B2 | 9/2007 | Kembaiyan | |
| 7,337,941 B2 | 3/2008 | Scott et al. | |
| 7,442,877 B2 | 10/2008 | Kamata et al. | |
| 7,858,204 B2 * | 12/2010 | Campbell | B23K 35/40 |
| | | | 428/358 |
| RE42,329 E | 5/2011 | Fuerstenau et al. | |
| 8,274,014 B2 | 9/2012 | Campbell et al. | |
| RE44,343 E | 7/2013 | Fuerstenau et al. | |
| 8,507,833 B2 | 8/2013 | Belohlav | |
| 8,740,041 B2 * | 6/2014 | Visser | B23P 13/04 |
| | | | 148/23 |
| 2002/0020468 A1 | 2/2002 | Schuster et al. | |
| 2003/0141350 A1 | 7/2003 | Noro et al. | |
| 2003/0203137 A1 | 10/2003 | Teshima et al. | |
| 2004/0171721 A1 | 9/2004 | Esemplare | |
| 2005/0051598 A1 | 3/2005 | Heminway et al. | |
| 2005/0089440 A1 | 4/2005 | Kembaiyan | |
| 2007/0093574 A1 | 4/2007 | Esemplare | |
| 2007/0251602 A1 | 11/2007 | Gagnon, Jr. et al. | |
| 2008/0017696 A1 | 1/2008 | Urech et al. | |
| 2009/0014093 A1 | 1/2009 | Campbell et al. | |
| 2009/0020276 A1 | 1/2009 | Ueda et al. | |
| 2009/0077736 A1 | 3/2009 | Loberger et al. | |
| 2009/0101238 A1 | 4/2009 | Jossick et al. | |
| 2009/0200363 A1 | 8/2009 | Means et al. | |
| 2009/0261574 A1 | 10/2009 | Blueml et al. | |
| 2010/0122997 A1 | 5/2010 | Liu | |
| 2010/0219231 A1 | 9/2010 | Means et al. | |
| 2011/0023319 A1 | 2/2011 | Fukaya et al. | |
| 2011/0089222 A1 | 4/2011 | Campbell et al. | |
| 2011/0123824 A1 | 5/2011 | Belohlav et al. | |
| 2012/0207643 A1 | 8/2012 | Belohlav et al. | |
| 2013/0017393 A1 | 1/2013 | Campbell et al. | |
| 2014/0008416 A1 | 1/2014 | Visser et al. | |

FOREIGN PATENT DOCUMENTS

| | | |
|---|---|---|
| CA | 1146025 A | 5/1983 |
| CA | 1303650 A | 6/1992 |
| CN | ZL 200780027486.6 | 8/2012 |
| DE | 1298967 B | 7/1969 |
| DE | 2522589 A * | 12/1975 |
| DE | 2931040 A1 | 2/1980 |
| DE | 8910519 U1 | 10/1989 |
| DE | 60120250 T2 | 4/2007 |

(56) References Cited

FOREIGN PATENT DOCUMENTS

| | | | |
|---|---|---|---|
| DK | 323379 A | 2/1980 |
| EP | 0991697 A1 | 4/2000 |
| EP | 1127653 A2 | 8/2001 |
| ES | 483021 A1 | 4/1980 |
| FR | 2349392 | 11/1977 |
| FR | 2432360 | 2/1980 |
| GB | 0692710 A | 6/1953 |
| GB | 1180735 A | 2/1970 |
| GB | 1481140 A | 7/1977 |
| GB | 2027617 A | 2/1980 |
| IE | 48459 | 1/1985 |
| IN | 152853 | 4/1984 |
| IT | 1193704 | 8/1988 |
| JP | 55045591 A | 3/1980 |
| JP | 58000375 A | 1/1983 |
| JP | 62034698 A | 2/1987 |
| JP | 63040697 A | 2/1988 |
| JP | 6333694 A | 12/1988 |
| JP | 01066093 A | 3/1989 |
| JP | 2179384 A | 7/1990 |
| JP | 3005094 A | 1/1991 |
| JP | 3204169 A | 9/1991 |
| JP | 4371392 A | 12/1992 |
| JP | 6007987 A | 1/1994 |
| JP | 11347783 A | 12/1999 |
| JP | 2002512655 A | 4/2002 |
| MX | 302328 | 8/2012 |
| NL | 7905877 | 2/1980 |
| NO | 792504 A | 2/1980 |
| SE | 7906495 A | 2/1980 |
| WO | 9900444 A1 | 1/1999 |
| WO | 0039172 A1 | 7/2000 |
| WO | 0052228 A1 | 9/2000 |
| WO | 0064626 A1 | 11/2000 |
| WO | 0200569 A2 | 1/2002 |
| WO | 0231023 A1 | 4/2002 |
| WO | 03068447 A1 | 8/2003 |
| WO | 03089176 A1 | 10/2003 |
| WO | 2004061871 A1 | 7/2004 |
| WO | 2004094328 A1 | 11/2004 |
| WO | 2007058969 A2 | 5/2007 |
| WO | 2007058969 A3 | 5/2007 |
| WO | 2007140236 A1 | 12/2007 |
| WO | 2008148088 A1 | 12/2008 |
| ZA | 7903893 A | 7/1980 |

OTHER PUBLICATIONS

Examination Report of SIPO for CN 200780027486.6 mailed Dec. 17, 2010.
Extended European Search Report for EP 07762314.8 mailed Dec. 13, 2012.
International Preliminary Report on Patentability dated Dec. 1, 2009 for PCT/US08/064871.
International Preliminary Report on Patentability dated Dec. 11, 2008 for PCT/US07/069636.
International Preliminary Report on Patentability dated Nov. 9, 2006 for PCT/US06/043856.
International Preliminary Report on Patentability dated Jun. 16, 2009 for PCT/US07/025309.
International Search Report dated Dec. 4, 2008 for PCT/US08/064871.
International Search Report dated Nov. 8, 2007 for PCT/US07/069636.
International Search Report dated Apr. 9, 2008 for PCT/US07/025309.
International Search Report dated Dec. 21, 2007 for PCT/US06/043856.
Written Opinion of International Searching Authority for PCT/US06/043856, dated May 10, 2008.
Written Opinion of International Searching Authority for PCT/US07/069636, dated May 24, 2007.
Written Opinion of International Searching Authority for PCT/US07/025309, dated Dec. 11, 2007.
Written Opinion of International Searching Authority for PCT/US08/064871, dated Nov. 25, 2009.
Belohlav, A.; "Understanding Brazing Fundamentals", The American Welder, Sep.-Oct. 2000; Jul. 1, 2008; retrieved from <http://www.aws.org/wj/amwelder/9-00/fundalmentals.html>.
Omni Technologies Corporation; "SIL-CORE Product Catalog"; undated (6 pages).
Day, S.A.; Material Safety Data Sheet for "Aluminum Flux Cored Wire and Rings"; pp. 1-5; Feb. 23, 2004 (5 pages).
Day, S.A.; Material Safety Data Sheet for "Flux Coating Part 'A'"; pp. 1-6; May 2, 2006 (6 pages).
Day, S.A.; Material Safety Data Sheet for "Flux Coating Part 'B'"; pp. 1-3; May 2, 2006 (3 pages).
US Patent Office, International Search Report and Written Opinion of International Searching Authority for PCT/US2015/036606 mailed Nov. 24, 2015 (11 pages).

* cited by examiner

US 9,731,383 B2

FILLER METAL WITH FLUX FOR BRAZING AND SOLDERING AND METHOD OF USING SAME

CROSS-REFERENCE TO RELATED APPLICATIONS

N/A

FEDERALLY SPONSORED RESEARCH OR DEVELOPMENT

N/A

TECHNICAL FIELD

The invention relates to relates to wire used in brazing and soldering. More particularly, the present invention is directed to a channeled wire having a flux solution deposited therein for use in joining two similar or dissimilar metals in industrial applications.

BACKGROUND OF THE INVENTION

Brazing and soldering are two methods commonly used to join two similar or dissimilar metals together. These processes typically involve joining metal components together by disposing a brazing composition such as an aluminum or metal alloy adjacent to or between the faying surfaces, i.e., the surfaces to be joined. The brazing filler alloy and the faying surfaces are then heated to the brazing temperature, typically above the melting temperature of the braze alloy but below the melting temperature of the components to be joined. The brazing composition then melts, flows into the joint by capillary action and forms a fillet and seal that bonds the faying surfaces.

In most cases, these processes require a chemical flux in addition to the filler alloy. The flux prepares the base metals to accept the filler alloy which results in a strong bond. Fluxes are generally grouped under two categories: corrosive (must be removed) and non-corrosive (residues are left on the part).

Historically, the alloy and flux are applied as two separate steps. In recent years however, an increasing number of options have been developed that combine the filler alloys and fluxes in one complete form. These developments have taken place with brazing alloys that are aluminum based and silver based.

For instance, Omni Technologies Corporation (Epping, N.H.) developed a flux core wire, which is sold under the trademark SIL-CORE™. In order to accomplish this, Omni takes aluminum in the form of narrow sheet, deposits a quantity of powdered flux down the middle, and then form rolls the narrow sheet around the flux. This material is then put through draw dies to reduce the diameter and compact the flux inside. From this process, Omni offers several wire diameters as well as different flux compositions. In addition, the amount of flux can be changed as needed. This material is available on spools, large coils and custom fabricated shapes. The inventors of the present invention believe Omni uses a flux sold by Solvay Chemical Company under the name NOCOLOK®. NOCOLOK® brand is one of the most widely recognized non-corrosive aluminum fluxes. This product is described in U.S. Pat. No. 5,781,846, which is hereby incorporated by reference as if fully set forth herein. Omni claims the SIL-CORE™ product does not contain a binding agent.

The S.A. Day Corporation (Buffalo, N.Y.) produces an aluminum flux coated rod sold under name DAYROD. This rod includes an aluminum wire cut to 12 inch rods, and dipped in an aluminum flux bath. After dipping, the rods are hung to dry. Day does not use NOCOLOK® brand flux. Instead, Day uses a similar formulation which is mixed with a polymer-based binder system. This binder allows for the flux to remain ductile and not brittle. The flux coated rods can be bent or twisted and the flux will not fall off.

Day also produces a flux coated ring. Day purchases metallic rings from Bellman-Melcor, Inc. The rings are then loaded on a machine that "paints" a thin coating of flux on the outside edge of each ring. While the end product is acceptable, it is very slow to produce and consequently very expensive. Similar to the rods, the rings can be handled roughly and the flux remains intact.

Protechno-Richard (France) offers a product very similar to the Omni product.

Kin-Met (Korea) produces an extruded product. A powdered form of aluminum braze alloy is mixed with powdered flux. The combination is pressurized and extruded into final form.

Wolverine and Omni teamed up to create a flux coating for silver based materials. Made from a ductile binder system, this technology is sold under the name SILVACOTE™. SILVACOTE™ is a continuously coated, flux-coated brazing material.

U.S. Pat. No. 7,858,204, which is hereby incorporated by reference as if fully set forth herein, describes a wire for use in a brazing or soldering operation. The wire includes an elongated body of a metallic material, a channel having an opening formed along a length of the elongated body, the opening having a width of about 30% to 70% of a major axis of a cross-section of the elongated body, a cured flux solution formed by curing a flux solution comprising a polymer-based binder material and a flux material within the channel and along at least a portion of the length of the elongated body with a surface of the cured flux solution being exposed through the opening in the channel. The wire is formed into an annular ring, and the cured flux solution within the channel forms a portion of an inner wall of the annular ring. The '204 patent also describes alternative embodiments, one of which includes a plurality of flux solution-containing channels formed in a wire. The channels are formed along a transverse length of the wire. The wire maybe formed into an annular ring such that the channels bearing the flux solution form a portion of an inner wall of the ring. The outer wall of the ring includes a section or portion of each channel and thus the flux solution within each channel also forms a portion of the outer wall of the ring.

U.S. Pat. No. 8,274,014 was issued from a continuation-in-part application claiming priority from the application from which the '204 patent issued. The '014 patent is also incorporated by reference as if fully set forth herein. The '014 patent is directed to wire for brazing or soldering comprising a first channel and a second channel, both extending lengthwise along the central axis of the wire. The first and second channels comprise a pair of sidewalls extending lengthwise along the central axis separated by a transverse base. Each sidewall extends radially outwardly from the base and forming an angle with the base greater than 90 degrees;

Despite the advancement provided by the '204 and '014 patents, there is a need for a brazing or soldering wire that can be used to create a better joint between connected parts. It would be an advancement in the art of brazing or soldering wire to provide such a wire capable of forming a larger joint area with improved distribution of flux over the area of the part or parts to be joined.

The present invention is provided to solve the problems discussed above and other problems, and to provide advantages and aspects not provided by prior brazing or soldering wires of this type. A full discussion of the features and advantages of the present invention is deferred to the following detailed description, which proceeds with reference to the accompanying drawings.

SUMMARY OF THE INVENTION

One aspect of the present invention is directed to a wire for use in a brazing or soldering operation. The wire comprises an elongated body of a metallic material. A pair channels each have an opening formed along a length of the elongated body. A divider is formed by a portion of the elongated body and separates the pair of channels. The divider has opposing walls extending outwardly from corresponding base portions of the pair of channels. The opposing walls terminate at distal ends, and a first engagement surface is formed therebetween. A pair of outer walls are separated by the pair of channels and the divider. The outer walls each extend outwardly from corresponding base portions of each of the pair of channels. A second engagement surface is formed between an outer surface of the elongated wire and a terminal end of one of the outer walls and is substantially coplanar with the first engagement surface. A third engagement surface is formed between the outer surface of the elongated wire and a terminal end of the other of the outer walls and substantially is coplanar with the first engagement surface. A cured flux solution within the pair of channels. Corresponding surfaces of the cured flux solution are exposed through the opening in each channel.

This aspect of the invention may include one or more of the following features, alone or in any reasonable combination. Each channel may have an angled wall extending outwardly from a corresponding base portion. The angled walls may each have an angle orientation relative to a common axis, and each angle orientation may be identical. The angled walls may each have an angle orientation relative to a common axis, and a first angle orientation of a first angled wall may be opposite a second angle orientation of a second angled wall. The pair of channels may be substantially parallel and extend lengthwise along the elongated body. The divider may have opposing walls extending outwardly from corresponding base portions of the pair of channels and angled such that the opposing walls converge and terminate at distal ends wherein a first engagement surface is formed therebetween. The first engagement surface may have a substantially planar profile. The wire may further comprise a pair of diverging walls separated by the pair of channels and the divider. The diverging walls may each extend outwardly from corresponding base portions of each of the pair of channels and angle such that a first distance between the diverging walls adjacent the corresponding base portions is less than a second distance between the diverging walls at corresponding terminal ends of the diverging walls opposite the corresponding base portions. The wire may be substantially E-shaped when viewed in cross-section taken transverse to a length of the wire. The second and third engagement surfaces may be substantially coplanar.

Another aspect of the present invention is also directed to a wire for use in a brazing or soldering operation. The wire comprises an elongated body of a metallic material. A pair channels each have an opening formed along a length of the elongated body. A divider is formed by a portion of the elongated body separating the pair of channels. The divider has opposing walls extending outwardly from corresponding base portions of the pair of channels. The opposing walls terminate at distal ends wherein a first engagement surface is formed therebetween. A pair of outer walls is separated by the pair of channels and the divider. The outer walls each extend outwardly from corresponding base portions of each of the pair of channels. A second engagement surface is formed between an outer surface of the elongated wire and a terminal end of one of the outer walls. A third engagement surface is formed between the outer surface of the elongated wire and a terminal end of the other of the outer walls and is substantially coplanar with the second engagement surface. A cured flux solution is within the pair of channels. Corresponding surfaces of the cured flux solution are exposed through the opening in each channel.

This aspect of the invention may include one or more of the following features, alone or in any reasonable combination. Each channel may have an angled wall extending outwardly from a corresponding base portion. The angled walls may each have an angle orientation relative to a common axis, and each angle orientation may be identical. The angled walls may each have an angle orientation relative to a common axis, and a first angle orientation of a first angled wall may be opposite a second angle orientation of a second angled wall. The pair of channels may be substantially parallel and extend lengthwise along the elongated body. The divider may have opposing walls extending outwardly from corresponding base portions of the pair of channels and angled such that the opposing walls converge and terminate at distal ends wherein a first engagement surface is formed therebetween. The first engagement surface may have a substantially planar profile. The wire may further comprise a pair of diverging walls separated by the pair of channels and the divider. The diverging walls may each extend outwardly from corresponding base portions of each of the pair of channels and angle such that a first distance between the diverging walls adjacent the corresponding base portions is less than a second distance between the diverging walls at corresponding terminal ends of the diverging walls opposite the corresponding base portions. The wire may be substantially E-shaped when viewed in cross-section taken transverse to a length of the wire. The second and third engagement surfaces may be substantially coplanar.

Another aspect of the present invention is also directed to a wire for use in a brazing or soldering operation. The wire comprises an elongated body of a metallic material. A pair of substantially parallel channels each have an opening formed along a length of the elongated body. A divider is formed by a portion of the elongated body separating the pair of channels. The divider has opposing walls extending outwardly from corresponding base portions of the pair of channels and is angled such that the opposing walls converge and terminate at distal ends wherein a first engagement surface is formed therebetween having a substantially planar profile. A pair of diverging walls is separated by the pair of channels and the divider. The diverging walls each extend outwardly from corresponding base portions of each of the pair of channels and each is angled such that a first distance between the diverging walls adjacent the corresponding base portions is less than a second distance between the diverging walls at corresponding terminal ends of the diverging walls opposite the corresponding base portions. A second engagement surface is formed between an outer surface of the elongated wire and the terminal end of one of the diverging walls and has a substantially planar profile substantially coplanar with the first engagement surface. A third engagement surface is formed between the outer surface of the elongated wire and the terminal end of the other of the diverging walls and has a substantially planar profile substantially coplanar with the second engagement surface. A cured flux solution is formed by curing a flux solution comprising a polymer-based binder material and a flux material within the pair of channels. Corresponding surfaces of the cured flux solution are exposed through the opening in each channel. The elongated body is formed into an annular ring. The cured flux solution within the channels forms a portion of an inner wall of the annular ring. The cured flux solution within a first channel is located below a plane extending from the terminal end of one of the diverging walls to the distal end of one of the opposing walls of the divider, and the cured flux solution within a second channel is located below a plane extending from the terminal end of the other of the diverging walls to the distal end of the other of the opposing walls of the divider.

Another aspect of the present invention is directed to a preform produced from a wire and used in a brazing or soldering operation. The preform comprises a wire of an elongated body having a continuous external surface defining an exterior of the wire formed into an annular ring centered about a longitudinal axis and a flux solution. The wire comprises a first substantially circumferential channel recessed within the external surface of the wire. A second substantially circumferential channel is also recessed within the external surface of the wire. A substantially annular divider separates the first channel from the second channel and defines a first engagement surface therebetween The first engagement surface is positioned at a first radial distance from the longitudinal axis. A second engagement surface of the external surface of the wire is opposite the divider wherein the first substantially circumferential channel lies therebetween. The second engagement surface is positioned at a second radial distance from the longitudinal axis. A third engagement surface of the external surface of the wire is opposite the divider wherein the second substantially circumferential channel lies therebetween. The third engagement surface is positioned at a third radial distance from the longitudinal axis. A flux solution is cured within the first and second substantially circumferential channels and each have an exposed surface through respective openings in the first and second substantially circumferential channels. The exposed surface of the flux solution within the first substantially circumferential channel is positioned at a fourth radial distance from the longitudinal axis, and the exposed surface of the flux solution within the second substantially circumferential channel is positioned at a fifth radial distance from the longitudinal axis.

This aspect of the invention may include one or more of the following features, alone or in any reasonable combination. The first, second, and third radial distances may be equal. The first and second radial distances may be equal. The second and third radial distances may be equal. The fourth and fifth radial distances may be greater than the first, second, and third radial distances. The fourth and fifth radial distances may be about equal to the first, second, and third radial distances. The fourth and fifth radial distances may be less than the first, second, and third radial distances. A cross-sectional shape of the preform may be E-shaped. The annular ring may have a radially inner surface and a radially outer surface opposite the radially inner surface, and the radially inner surface may comprise the first, second, and third engagement surfaces. The annular ring may have a radially inner surface and a radially outer surface opposite the radially inner surface. The radially outer surface may comprise the first, second, and third engagement surfaces.

Another aspect of the present invention is directed to a wire for use in a brazing or soldering operation. The wire comprises: an elongated body of a metallic material; a channel having an opening formed along a length of the elongated body, the channel defined by a width of an opening thereto, first and second opposing inner angled walls and an inner base, the first and second inner angled walls converging from the opening towards the inner base such that a width of the opening is greater than a width of the inner base; first and second outer angled walls are separated from the first and second inner angled walls, respectively, by first and second engagement surfaces, the first and second outer angled walls converging from the first and second engagement surfaces towards an outer base such that a width of the outer base is greater than a width of the wire defined by a width of the first engagement surface, a width of the second engagement surface, and the width of the opening; and a cured flux solution within the channel, wherein a surface of the cured flux solution is exposed through the opening in the channel.

This aspect of the invention may include one or more of the following features, alone or in any reasonable combination. The outer base may be positioned entirely on a first plane that is substantially parallel to a second plane on which the inner base is entire positioned. The first inner angled wall may be parallel to the first outer angled wall. The second inner angled wall may be parallel to the second outer angled wall. The first and second engagement surfaces may be entirely positioned on a third plane which is substantially parallel to the first and second planes. The wire may be formed into an annular preform. A radially innermost contacting area of an annular preform may comprise the first engagement surface, the second engagement surface, and the surface of the cure flux solution exposed through the opening in the channel. A radially outermost contacting area of an annular preform may comprise the first outer angled wall. A sum of the width of the first engagement surface and the width of the second engagement surface may be less than the width of the opening in the channel. An outer surface of the wire may comprise the first and second engagement surfaces, the first and second outer angled walls, the outer base, and the exposed surface of the cured flux solution, forming a trapezoidal shape in a cross-section taken transverse to a length of the elongated body.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
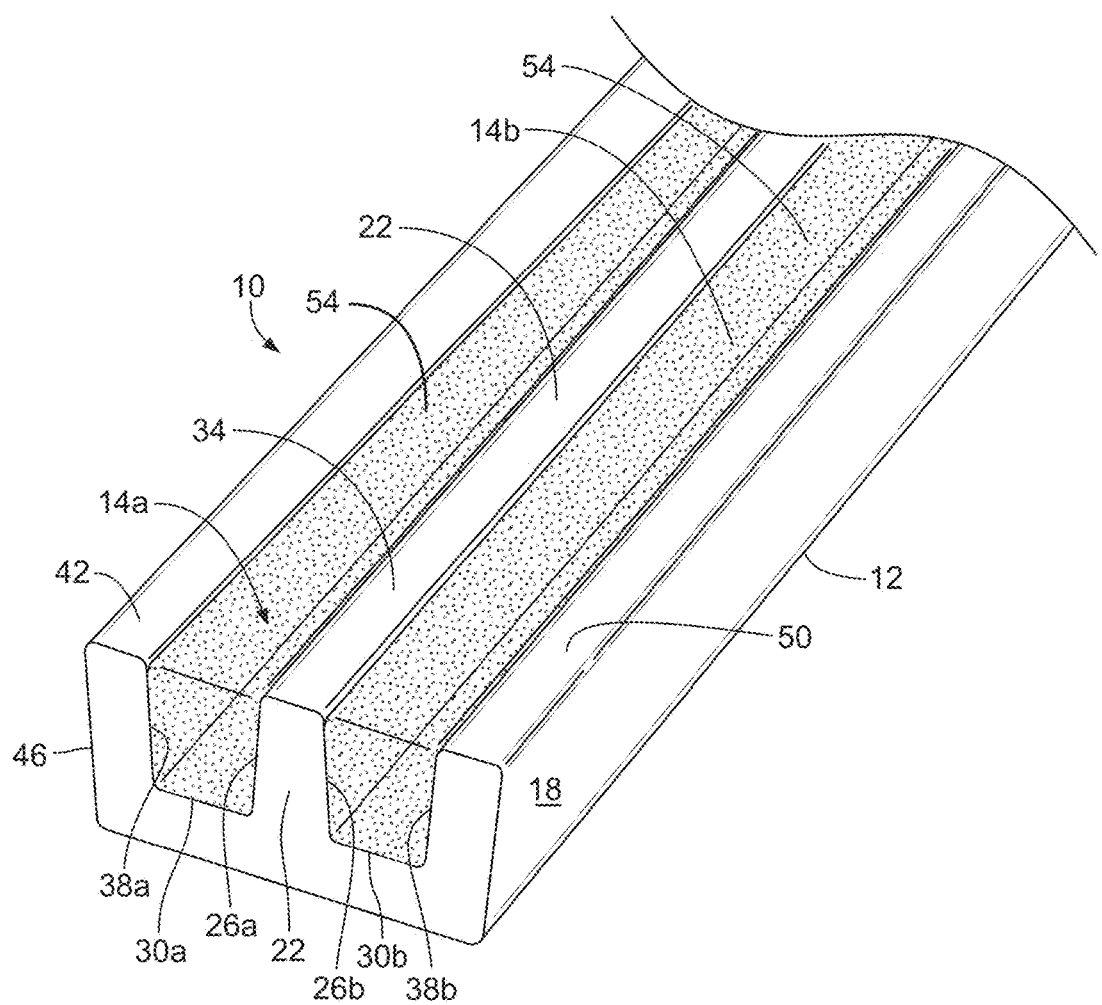
FIG. 1 is a perspective view of a wire of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a brazing/soldering wire for use in multiple metal combinations including aluminum applications. The end use for these materials is typically industrial applications, such as automobiles and automobile component manufacturing as well as other heat transfer applications including air conditioning and refrigeration manufacture. Of course, other applications can be had as well. The brazing/soldering wire of the present invention may be used on many different materials including aluminum alloys, zinc alloys, copper alloys and silver alloys, etc. The wire itself can be produced from an aluminum alloy, a silver alloy, a copper alloy, and/or a zinc alloy.

The Wire

The present invention includes a solid wire 10 rather than a narrow sheet or strip that is preferably very robust and will not move when assembled onto component parts. This is important because in air conditioning applications, braze wire is commonly supplied in ring-form. The rings are friction fit or snuggly placed around tubes. Because current ring shaped braze wires often lose their grip on component parts, causing the rings to shift or fall off altogether, rings formed from the wire 10 of the present invention are specifically constructed so as to be less likely to plastically deform by the friction fit about the component parts. As a result, they are less likely to shift or fall off prior to the brazing or soldering process. This important aspect of the present invention is described in more detail below.

Figure 2:
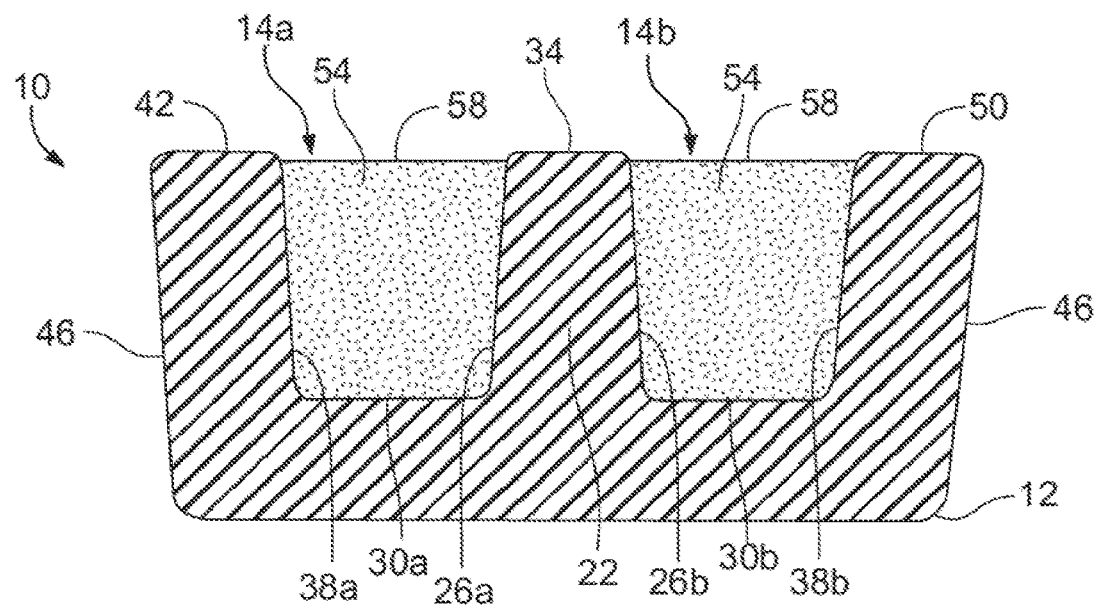
FIG. 2 is a cross-sectional view of the wire of FIG. 1.

Referring to FIGS. 1 and 2, a wire 10 having an elongated body 12 with a plurality of channels 14a,b reformed along an entire length of an external surface 18 is illustrated. The channels 14a,b are preferably a pair of lengthwise at least substantially parallel recesses formed in the external surface 18. The wire 10 is formed from a metallic material supplied at a diameter of about 0.031 inches to 0.125 inches (0.787 mm to 3.18 mm), preferably 0.079 inches to 0.090 inches (2.00 mm to 2.29 mm), or any range or combination of ranges therein. The wire 10 has been rolled or reformed to a new geometric shape, such as an E-shape configuration when viewed in a cross-section taken transverse to the length of the wire 10, generally perpendicular to the direction of the channels 14a,b. The channels 14a,b are formed in the external surface 18 of the wire 10. A deformation of the external surface 18 defines the shape of the wire 10.

A lengthwise divider 22 separates the channels 14a,b. According to the invention, the divider 22 is formed by a portion of the elongated body. The divider 22 has opposing walls 26a,b extending outwardly from corresponding base portions 30a,b of the pair of channels 14a,b. The walls 26a,b are angled such that they converge towards one another. Thus, walls 26a,b each have an angle orientation relative to a common axis wherein a first angle orientation of a first of the walls 26a is opposite a second angle orientation of a second of the walls 26b. The walls 26a,b terminate at distal ends. An engagement surface 34 of the external surface 18 is formed therebetween.

The engagement surface 34 preferably has a substantially planar profile.

A pair of channel outer walls 38a,b are separated by the pair of channels 14a,b and the divider 22. The outer walls 38a,b each extend outwardly from corresponding base portions 30a,b of each of the pair of channels 14a,b. The outer walls 38a,b are preferably diverging walls relative to each other and angled such that a first distance between the diverging outer walls 38a,b adjacent the corresponding base portions 30a,b is less than a second distance between the diverging outer walls 38a,b at corresponding terminal ends of the diverging outer walls 38a,b opposite the corresponding base portions 30a.B. The outer walls 38a,b each have an angle orientation relative to a common axis wherein each angle orientation is identical.

A second engagement surface 42 is formed outwardly of one of the outer walls 38a and is formed between an outer surface 46 of the elongated wire 10 and the terminal end of one of the outer walls 38a. The second engagement surface preferably has a substantially planar profile and is preferably, though not necessarily substantially coplanar with the first engagement surface 34.

A third engagement surface 50 is formed outwardly of the other of the outer walls 30b and is also formed between the outer surface 46 of the elongated wire 10 and the terminal end of the other of the outer walls 38b. The third engagement surface preferably has a substantially planar profile and is preferably substantially coplanar with the second engagement surface 42 and/or the first engagement surface 34.

A cured flux solution 54 formed by curing a flux solution comprising a polymer-based binder material and a flux material is located within one or both of the channels 14a,b, preferably both. Corresponding surfaces 58 of the cured flux solution 54 are exposed through openings in each channel 14a,b. The cured flux solution 54 within a first channel 14a is preferably located below a plane extending from the terminal end of one of the outer walls 38a to the distal end of one of the opposing walls 26a of the divider 22. The cured flux solution 54 within a second channel 14b is preferably located below a plane extending from the terminal end of the other of the outer walls 38b to the distal end of the other of the opposing walls 26b of the divider 22.

Figure 9:
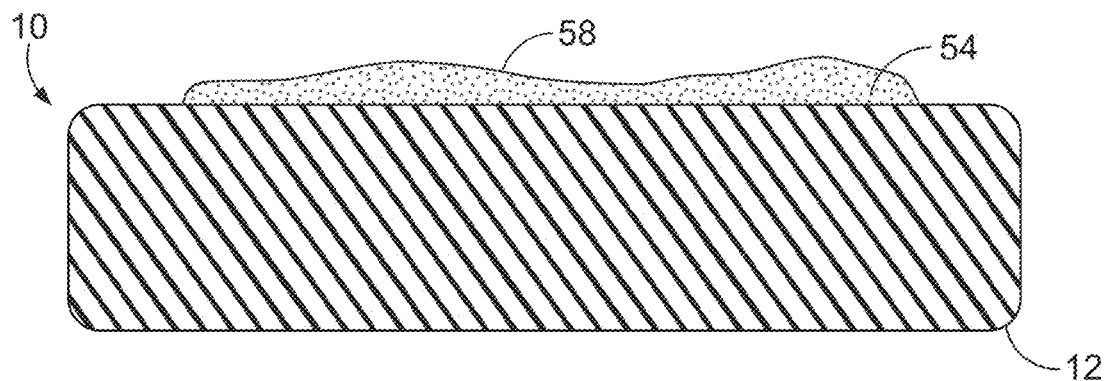
FIG. 9 is a cross-sectional view of an alternative embodiment of a wire of the present invention.
Figure 10:
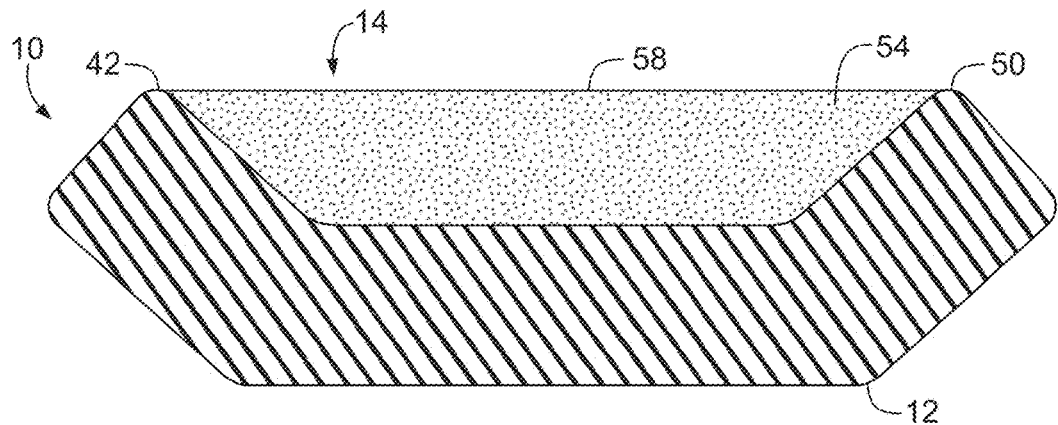
FIG. 10 is a cross-sectional view of an alternative embodiment of a wire of the present invention.
Figure 11:
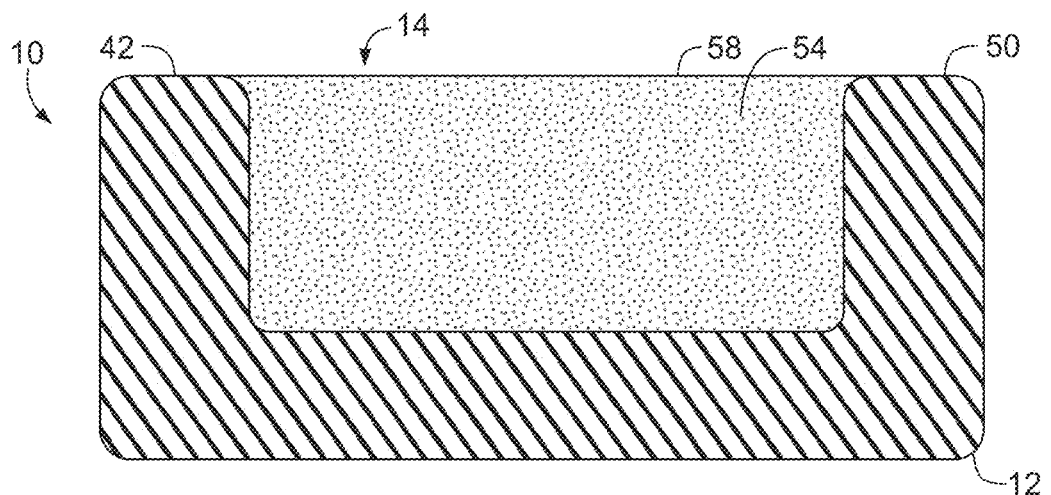
FIG. 11 is a cross-sectional view of an alternative embodiment of a wire of the present invention.
Figure 12:
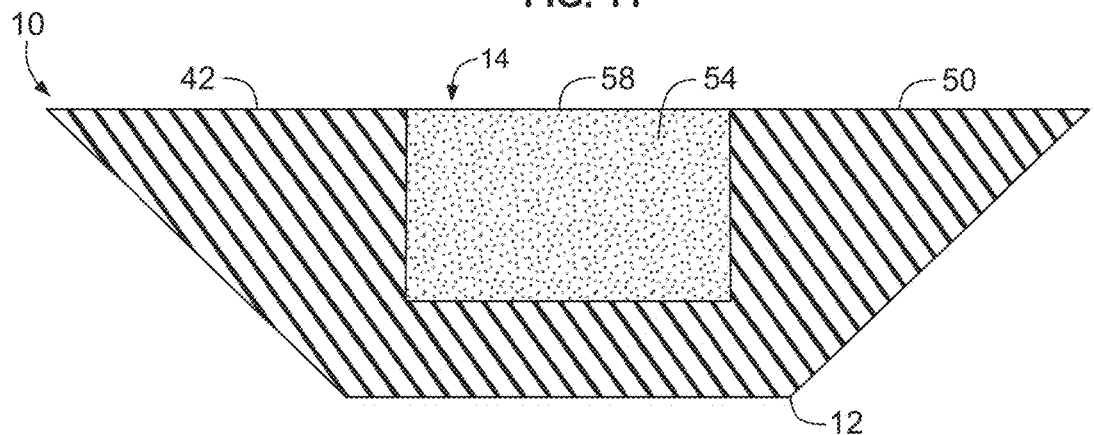
FIG. 12 is a cross-sectional view of an alternative embodiment of a wire of the present invention.

FIGS. 9-13 are examples of alternative embodiments of wires 10 of the present invention. In particular, FIG. 9 shows a channel-less wire 10 wherein the flux solution 54 is cured on an external surface of the wire which does not exhibit a channel, recess, or other striation. FIG. 10 shows a wire 10 having a channel 14a wherein outer walls 38a,b are flared outwardly at an angle greater than 90 degrees as measured from a base 30a of the channel. FIG. 11 shows another embodiment of wire 10. FIG. 12 shows a wire 10 having a faceted outer surface 46, substantially trapezoidal in cross-section.

Figure 14:
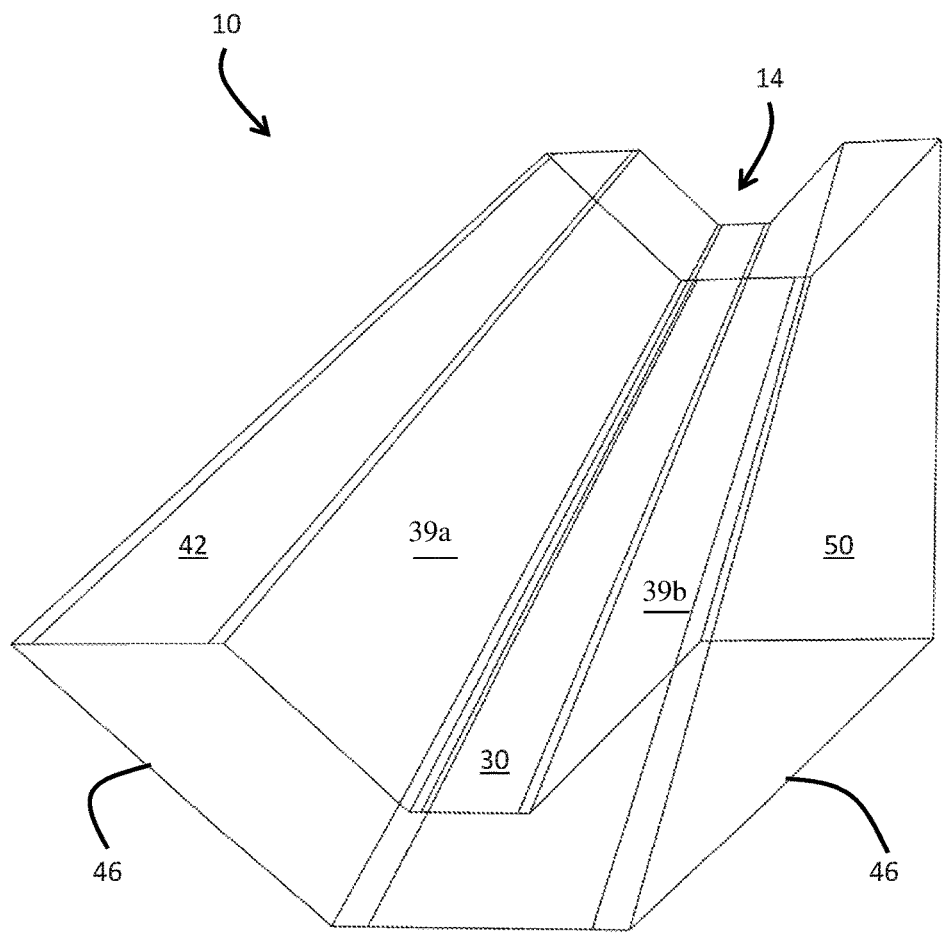
FIG. 14 is a perspective view of another embodiment of a wire of the present invention.
Figure 15:
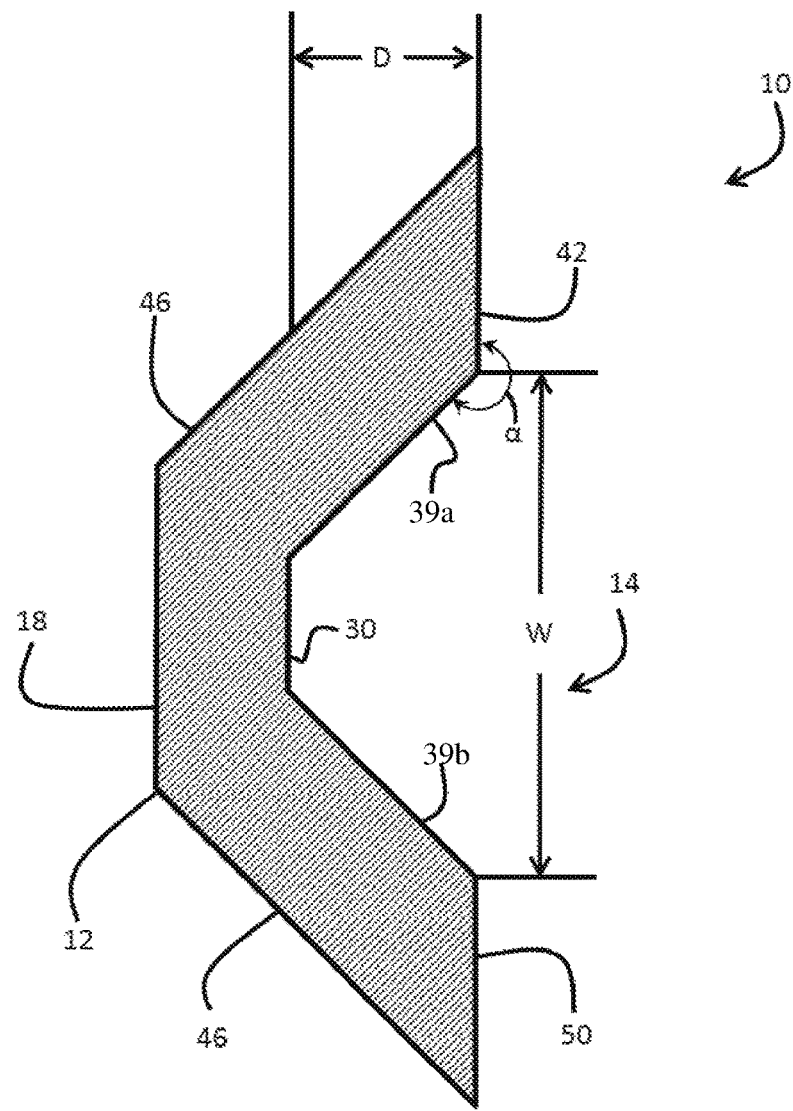
FIG. 15 is a cross-sectional view of the wire of FIG. 14.

An alternative embodiment is illustrated in FIG. 14. The reference numerals used relative to the previous embodiments are consistently with this embodiment. The preferred nominal dimensions of this wire 10 are 0.052 inches×0.125 inches.

The wire 10 of FIG. 14 has a single channel 14. The channel 14 is formed by a pair of opposing inner angled walls 39a,b which terminate at an inner base 30. Opposing outer angled walls 46 terminate at an outer base 32. One of the inner angled walls 39a is generally parallel to a corresponding outer angled wall 46, and the other of the inner angled walls 38b is generally parallel to the other outer angled wall 46. Engagement surfaces 42,50 separate each angled inner wall 39a,b from its corresponding angled outer wall 46.

The channel 14 has a depth D. The depth is preferably about 0.03 inches. An opening to the channel 14 has a cross-sectional width W of preferably 0.080 inches. The channel 14 is defined by the inner angled walls 39a b, the inner base 30, and the width W of the opening. The angled walls 39a,b form a converging structure wherein the width W of the opening is wider than a width of the inner base 30. Because the outer angled walls 46 are parallel to the inner angled walls 39a b, the outer base 32 has a greater width that the inner base 30. A sum of a width of a first engagement surface 42 and a width of the second engagement surface 50 is less than the width W of the opening in the channel 14.

Figure 16:
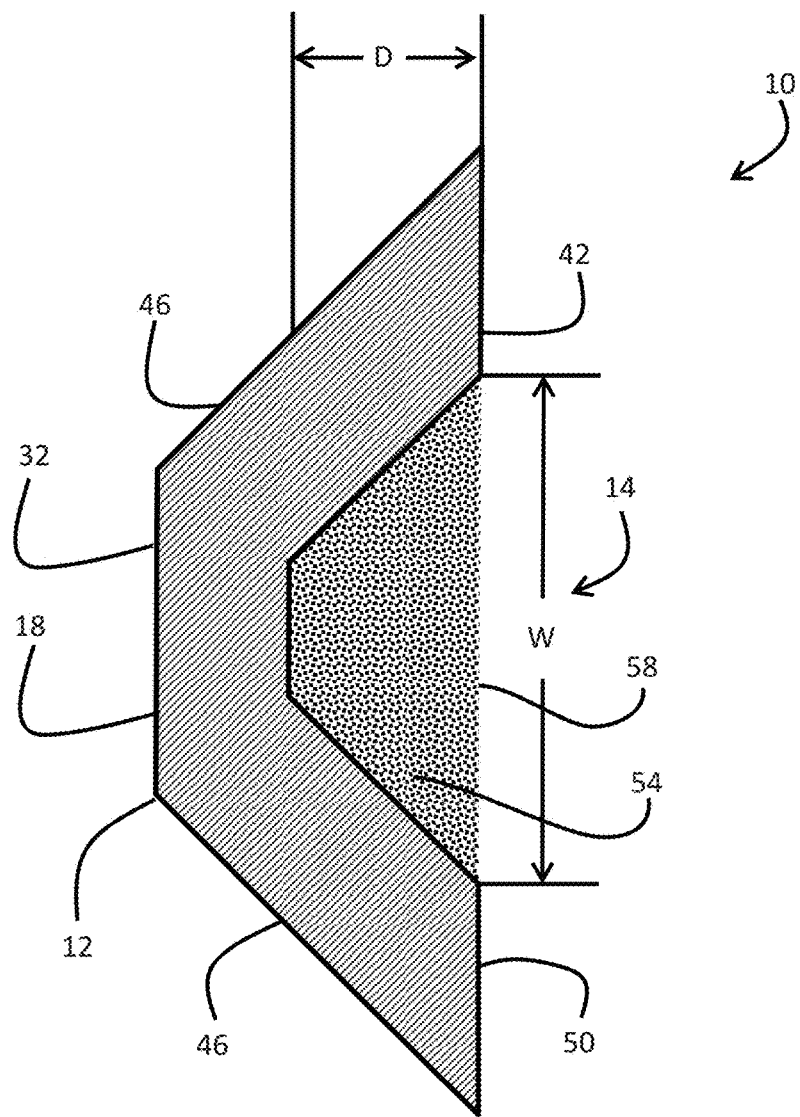
FIG. 16 is a cross-sectional view of the wire of FIG. 14 having a cured flux solution located within a channel.

A flux solution 54 is cured within the channel 14. The outer surface 18 of the wire 10 and an exposed surface 58 of the cured flux solution 54 form a trapezoidal shape in cross-section as illustrated in FIG. 16.

The engagement surfaces 42,50 are generally positioned on a common plane that is parallel to a plane on which the outer base 32 is positioned and a separate plane on which the inner base 30 is positioned. A sum of a width of a first engagement surface 42 and a width of the second engagement surface 50 is less than the width W of the opening in the channel 14.

The widths of the engagement surfaces 42,50 are preferably equal. Lengths of the outer angled walls 46 are preferably equal. Lengths of the inner angled walls 39a,b are preferably equal. When the parallel relationship of corresponding inner angled walls and outer angled walls exists, the wire 10 has consistent material thickness whereby a thickness of the wire does not vary when viewed in cross-section taken transverse to the elongated body of the wire. In other words, a width of the wire between the inner and outer bases is equal the widths of the engagement surfaces 42,50.

The wire 10 preferably has a constant thickness as measured along a line drawn at a right angle from both the inner angled walls 39a,b and the outer angled walls 46. Thus, the material between the inner angled walls 39a,b and the outer angled walls 46 has the same thickness as the material between the inner and outer bases 30,32, except for a segment of the wire 10 adjacent the engagement surfaces 42,50 where no such can be drawn. In this region, as shown in FIGS. 14-18, a length of the engagement surface 42,50, and by consequence and area of the engagement surface 42,50, can be expanded by reducing an angle α between the inner angled wall 39a,b and the engagement surfaces 42,50. This will create a region of the wire 10 wherein:

$$\cos\theta = \frac{\text{wire thickness}}{\text{engagement surface 42 length}}$$

$$\text{engagement surface 42 length} = \frac{\text{wire thickness}}{\cos\theta}$$

wherein:

$$\theta = 360° - (\alpha + 90°)$$

In one embodiment, the angle α is greater than 180 degrees and less than 260 degrees. In another embodiment, the angle α is greater than 200 degrees and less than 250 degrees. In another embodiment, the angle α is greater than or equal to 215 degrees and less than or equal to 240 degrees.

The Preforms

Preforms produced from the wire 10 of the present invention are illustrated in FIGS. 3-6. Each preform 100 comprises a wire 10 of an elongated body having a continuous external surface 18 defining an exterior of the wire 10 formed into an annular ring centered about a longitudinal axis and a flux solution 54. The wire 10 comprises a first substantially circumferential channel 14a recessed within the external surface 18 of the wire 10. A second substantially circumferential channel 14b is also recessed within the external surface 18 of the wire 10. A substantially annular divider 22 separates the first channel 14a from the second channel 14b. A first engagement surface 34 of the external surface 18 lies therebetween.

The first engagement surface 34 is positioned at a first radial distance from the longitudinal axis.

A second engagement surface 42 of the external surface 18 of the wire 10 is opposite the divider 22 and separated therefrom by a channel 14a such that the first substantially circumferential channel 14a lies therebetween. The second engagement surface 42 is positioned at a second radial distance from the longitudinal axis 104.

A third engagement surface 50 of the external surface 18 of the wire 10 is opposite the divider 22 and separated therefrom by the second substantially circumferential channel lies 14b. The third engagement surface 50 is positioned at a third radial distance from the longitudinal axis.

The flux solution 54 is cured within the first and second substantially circumferential channels 14a,b and each have an exposed surface through respective openings in the first and second substantially circumferential channels 14a,b. The exposed surface of the cured flux solution 54 within the first substantially circumferential channel 14a is positioned at a fourth radial distance from the longitudinal axis, and the exposed surface of the cured flux solution 14b within the second substantially circumferential channel 14b is positioned at a fifth radial distance from the longitudinal axis.

In at least one embodiment, the first and second radial distances are equal.

In at least embodiment, the first, second, and third radial distances are equal.

In at least one embodiment, the second and third radial distances are equal.

In at least one embodiment, the fourth and fifth radial distances are about equal to the first, second, and third radial distances.

Figure 3:
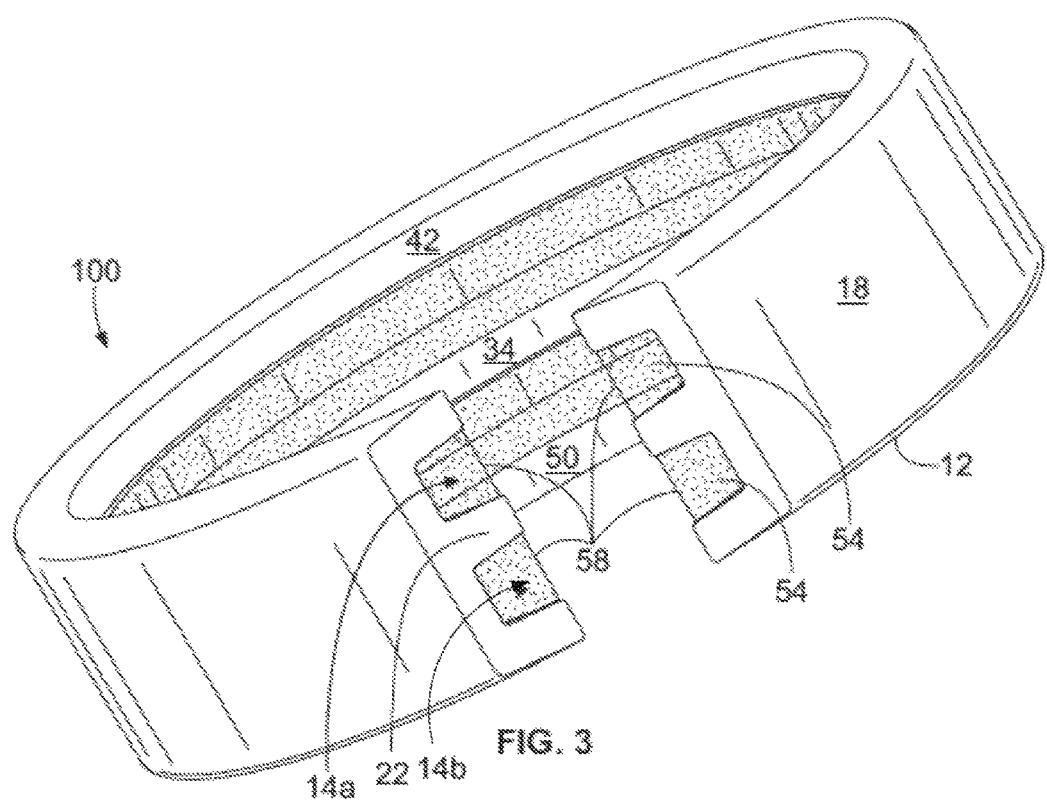
FIG. 3 is a perspective view of a preform formed from the wire of FIG. 1.
Figure 4:
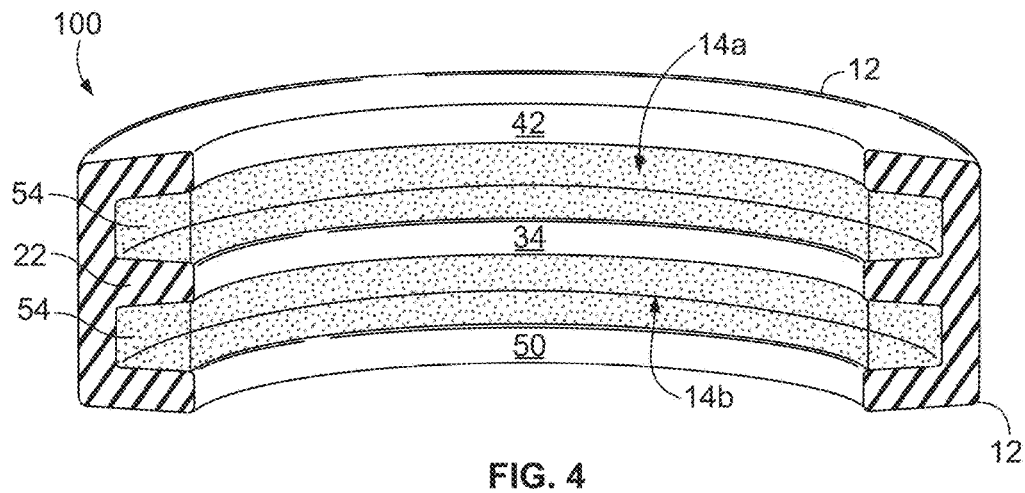
FIG. 4 is a cross-sectional view of the preform of FIG. 3.

In one embodiment illustrated in FIGS. 3 and 4, the fourth and fifth radial distances are greater than the first, second, and third radial distances.

In the embodiment illustrated in FIGS. 3 and 4, the preform 100 has a radially inner surface and a radially outer surface opposite the radially inner surface. The radially inner surface comprises the first, second, and third engagement surfaces 34,42,50.

Figure 5:
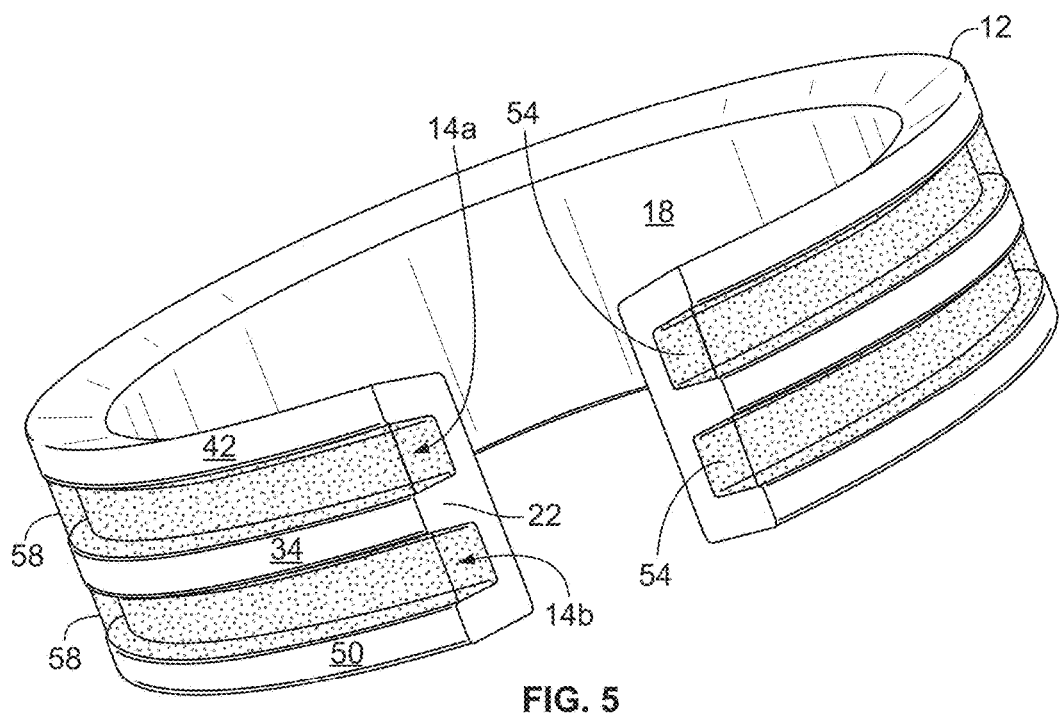
FIG. 5 is a perspective view of an alternative preform formed from the wire of FIG. 1.
Figure 6:
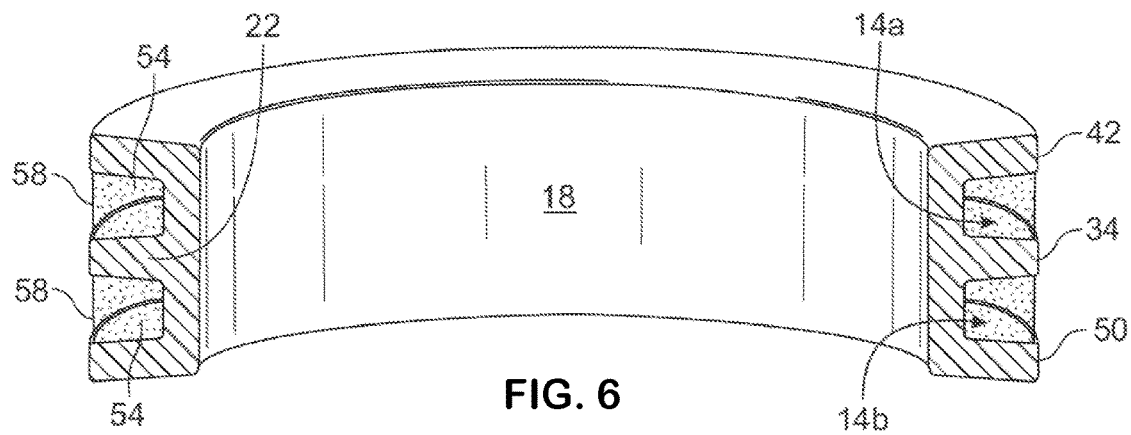
FIG. 6 is a cross-sectional view of the preform of FIG. 5.

In one embodiment illustrate in FIGS. 5 and 6, the fourth and fifth radial distances are less than the first, second, and third radial distances.

In the embodiment illustrated in FIGS. 5 and 6, the annular ring has a radially inner surface and a radially outer surface opposite the radially inner surface. The radially outer surface comprises the first, second, and third engagement surfaces 34,42,50.

In at least one embodiment, a cross-sectional shape of the preform 100 is E-shaped.

Figure 13:
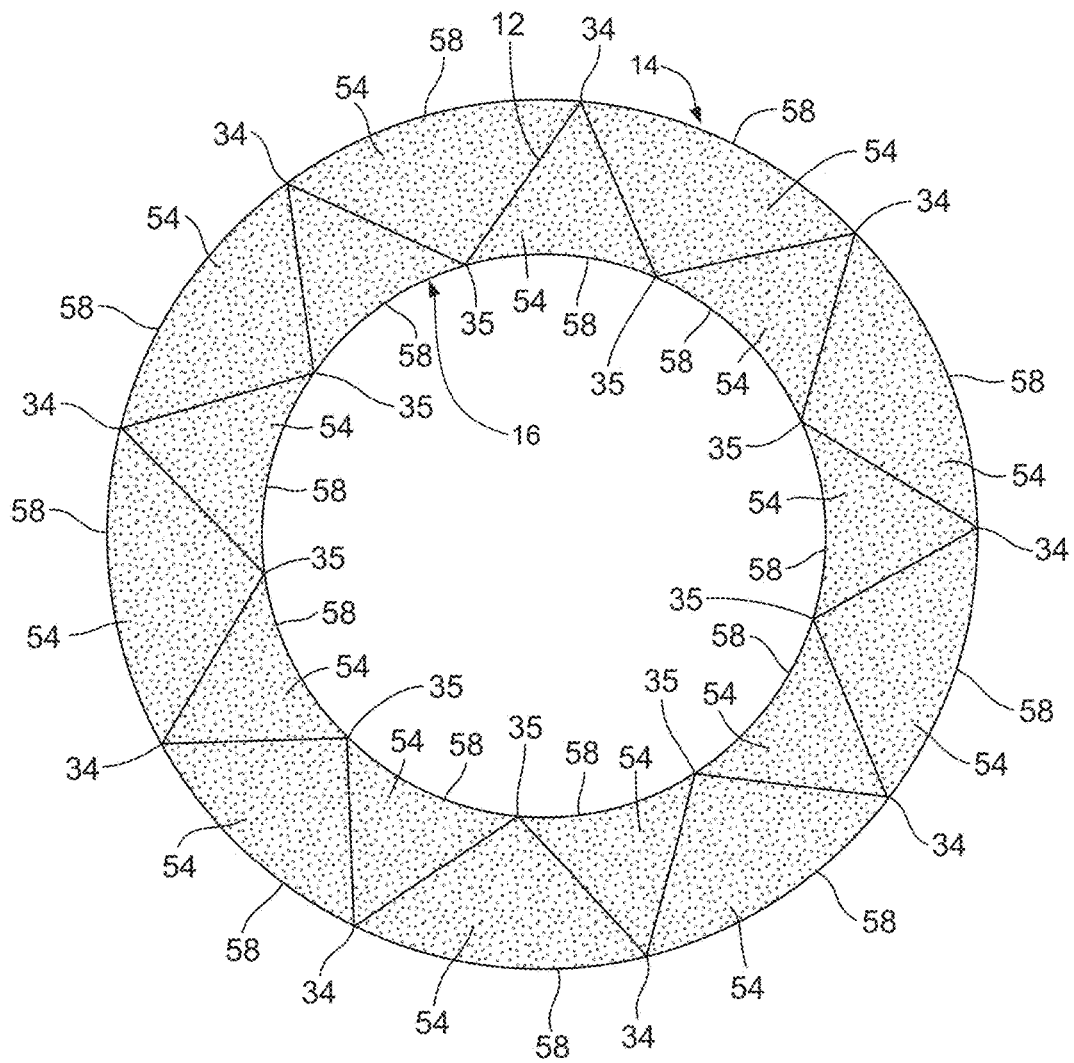
FIG. 13 is a cross-sectional view of an alternative embodiment of a wire of the present invention.

The preform of FIG. 13 is an alternative embodiment of the present in invention, A plurality of channels 14,16 are spaced about a circumference of the wire 10. A substantially round outer surface is formed by a combination of exposed surfaces 58 of the flux solution 54 within radially outer channels 14 and engagement surfaces 34 between each of the radially outer channels 14. In addition or optionally, a substantially round inner surface may also be formed by a combination of cured flux solution exposed surfaces 58 with a plurality of radially inner channels 16 and radially inner engagement surfaces 35. Channel walls converge at an apex wherein the channel walls diverge outwardly therefrom to promote flux solution flow upon a heating of the wire and/or flux solution 54 during use. The channels 14,16 have a substantially triangular shape when viewed in a cross-section taken transverse to the length of the elongated body 12.

Figure 17:
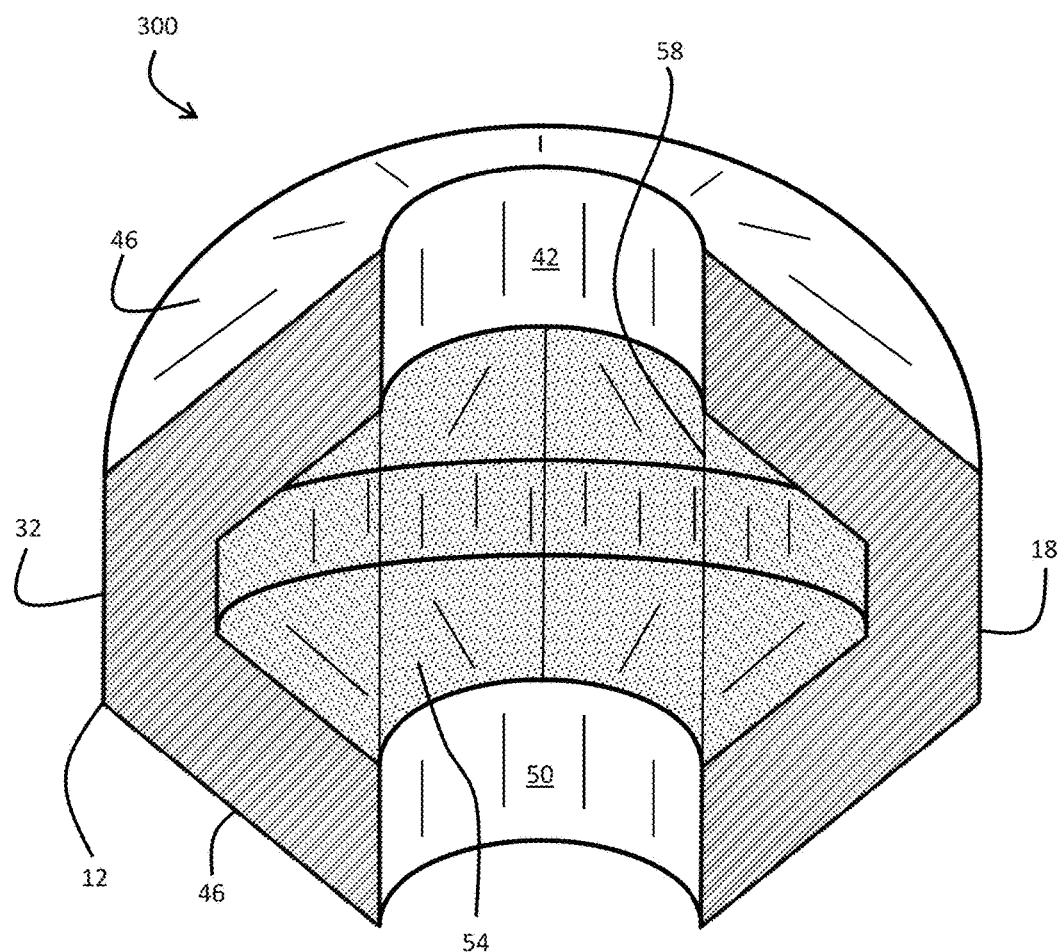
FIG. 17 is a cross-sectional perspective view of the wire of FIG. 16 formed into an annular preform for a subsequent brazing or soldering operation.

An alternative preform is illustrated in FIG. 17. This preform 300 follows the structural guidelines set forth above and is produced from the wire of FIG. 14, which is described above. Here, again, the wire 10 is formed into an annular preform 300. A radially inner most surface is made up of the engagement surfaces 42,50 and the exposed surface 58 of the cured flux solution 54. A radially outer surface is made up of the outer angled surfaces 46 converging to the outer base 32.

A Method of Use

Figure 7:
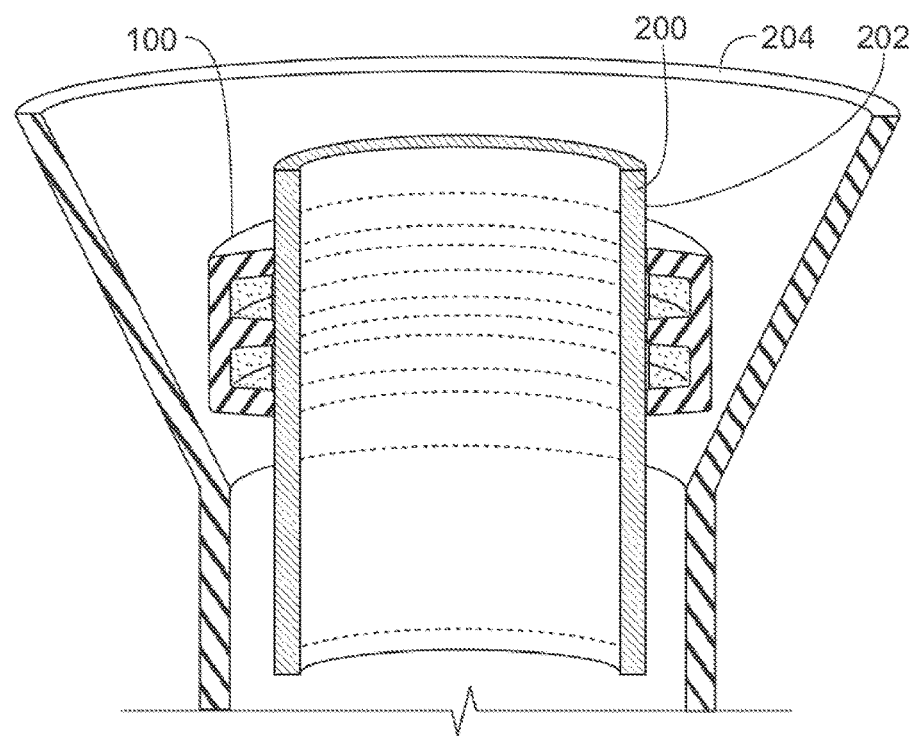
FIG. 7 is a view of the preform of FIG. 3 is use.
Figure 8:
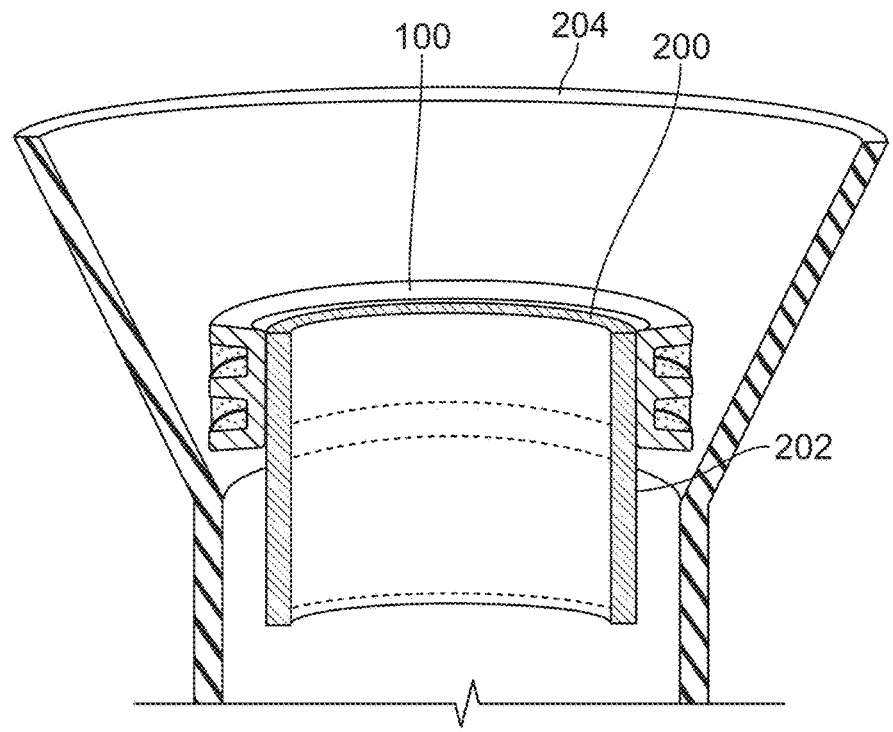
FIG. 8 is a view of the preform of FIG. 5 in use.

Methods of using a preform 100 of the present invention are illustrated in FIGS. 7 and 8. A first tubular metallic part 200 is to be joined to a second tubular metallic part 204. As illustrated in FIG. 7, using a preform 100 according to FIGS. 3 and 4, the first tubular part 200 is passed through the preform 100. The flux-laden channels 14a,b of the preforms 100 are located adjacent an outer surface 202 of the first tubular part 200. The second tubular part 204 has a radially outwardly flared flange 208 to aid in guiding an end portion of the first tubular part 200 into the second tubular part 204. The method illustrated in FIG. 8 utilizes a preform 100 according to FIGS. 5 and 6.

Figure 18:
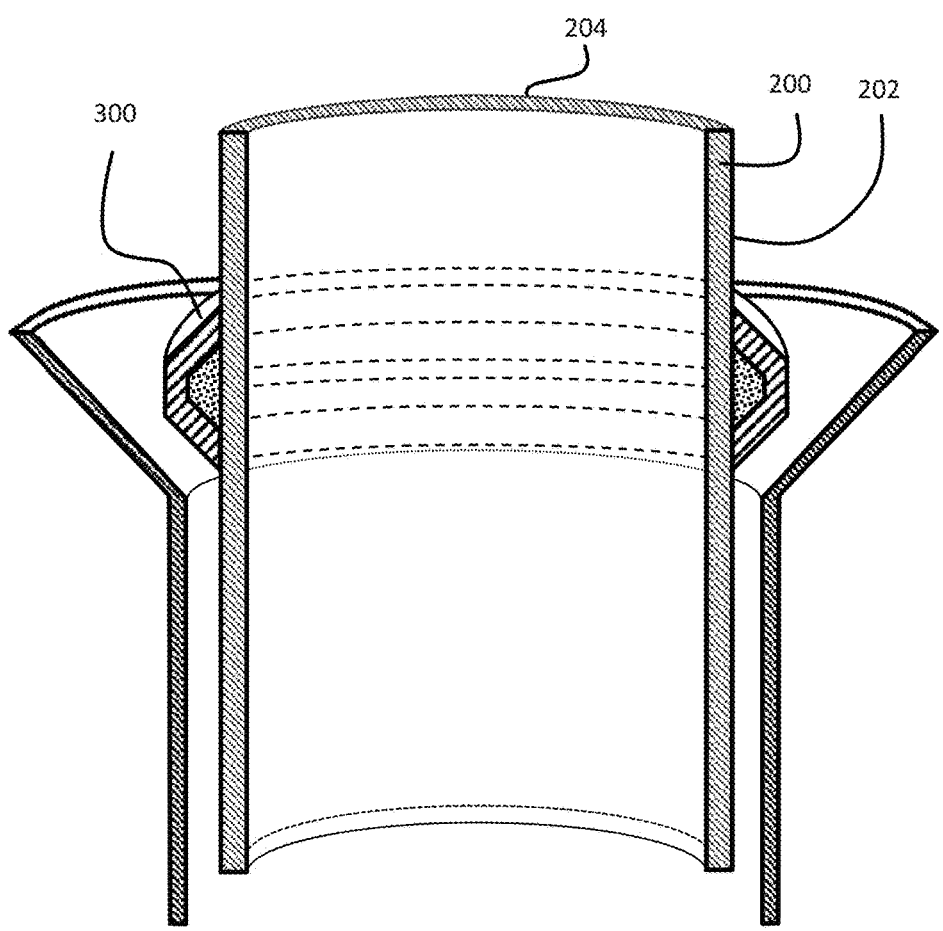
FIG. 18 is a cross-sectional view of a brazing operation employing the annular preform illustrated in FIG. 17.

A method of using a preform 300 of FIG. 17 is illustrated in FIG. 18. A first tubular metallic part 200 is to be joined to a second tubular metallic part 204. As illustrated in FIG. 18, using a preform 300 according to FIG. 17, the first tubular part 200 is passed through the preform 300. The flux-laden channel 14 of the preform 300 is located adjacent an outer surface 202 of the first tubular part 200. The second tubular part 204 has a radially outwardly flared flange 208 to aid in guiding an end portion of the first tubular part 200 into the second tubular part 204. The outer angled walls 46 of the preform 300 have an angle that is substantially equal to the angle of the flared flange 208 of the second tubular part 204, such that the preform 300 has engagement surfaces 42,50 in contact with the first tubular part 200, and one of the two outer angled walls 46 in contact with the flared flange 208 of the second tubular part 204. Preferably, a radially outer contacting surface is formed between the flared flange 208 and the outer angled wall 46 in engagement therewith is equal to an area of that outer angled wall 46. A radially inner contacting surface is made up of the two engagement surfaces 42,50 and the exposed surface 58 of the cured flux solution 54 with the outer surface 202 of the first tubular part 200.

Figure 19:
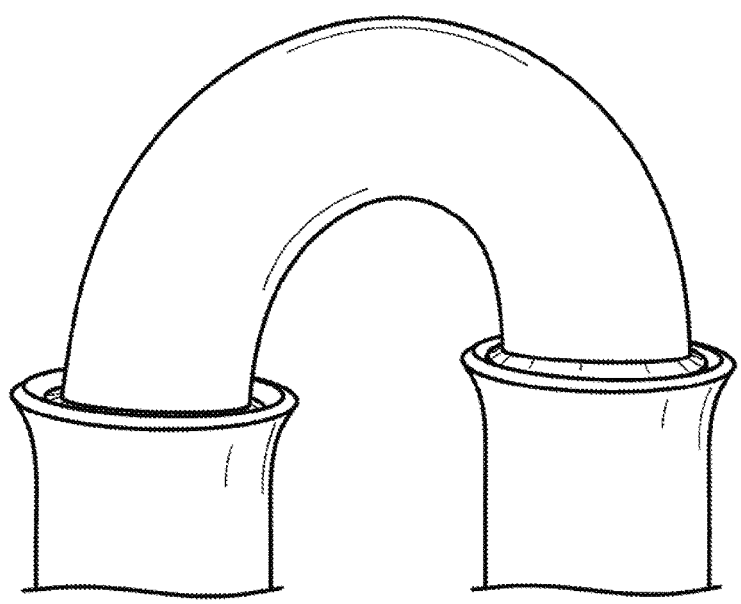
FIG. 19 is a reproduction of a portion of an evaporator coil showing a brazed connection using a preform of the present invention.

The method of FIG. 18 using the preform 300 of FIG. 17 has several advantages, especially when used in a preferred method of joining tubed components in a refrigeration evaporator as illustrated in FIG. 18. First, the wire 10 has a consistent material thickness, so thermal transfer of heat is more even during use. Thus, the entirety of an annular preform 300 made according to the teachings of the wire of FIG. 16 will liquefy simultaneously or substantially simultaneously. Secondly, due to the shape of the wire 10 of FIG. 14, when formed into the annular preform 300, the preform fits well and mates with parts to be joined by brazing, providing perfect alignment. Thirdly, a gap, to the extent one exists, between the outer surface 202 of the first tubular part 200 and the engagement surfaces 42,50 of the preform 300 is exactly the same all around the joint interface and a return bend in the evaporator is always straight, i.e. this eliminates crooked return bends (see FIG. 19). Finally, the structure is very resistant to distortion or "pull-back" during a heat cycle making this preform 300 product more forgiving and less dependent on a perfect heat pattern.

One of ordinary skill in the art would appreciate that the terms "first," "second," "upper," "lower," etc. are used for illustrative purposes only and are not intended to limit the embodiments in any way. The term "plurality" as used herein is intended to indicate any number greater than one, either disjunctively or conjunctively as necessary, up to an infinite number. The terms "joined," "attached," and/or "connected" as used herein are intended to put or bring two elements together so as to form a unit, and any number of elements, devices, fasteners, etc. may be provided between the joined, attached or connected elements unless otherwise specified by the use of the term "directly" and/or supported by the drawings. The term "annular" is used throughout the Specification to indicate a ring-like construction, and like many rings, the elements modified by the term "annular" are generally circumferential, but may have gaps, overlapping ends, unjoined ends, etc. that would improve the performance of the element in any way, especially in dimensional fit, strength, etc.

While the specific embodiments have been illustrated and described, numerous modifications come to mind without significantly departing from the spirit of the invention, and the scope of protection is only limited by the scope of the accompanying Claims.

What is claimed is:

1. A wire for use in a brazing or soldering operation, the wire comprising:
   a ring formed from a metallic material, the ring having a first end and a second end and is centered about a longitudinal axis;
   a pair of channels extending along an inner circumference of the ring perpendicular to an axis of the ring, each channel having an opening formed along the circumference of the ring facing the longitudinal axis of the ring;

a divider formed by a portion of the ring separating the pair of channels, the divider having opposing planar walls extending outwardly from corresponding planar base portions of the pair of channels wherein each of the base portions are co-planar, the opposing planar walls terminating at distal ends wherein a first engagement surface is formed therebetween;

a pair of outer planar walls separated by the pair of channels and the divider, the outer walls each extending outwardly from the corresponding base portions of each of the pair of channels;

a second engagement surface formed between an outer surface of the ring and a terminal end of one of the outer walls;

a third engagement surface formed between the outer surface of the ring and a terminal end of the other of the outer walls and substantially coplanar with the second engagement surface; and a cured flux solution within the pair of channels, wherein corresponding surfaces of the cured flux solution are exposed through the opening in each channel.

2. The wire of claim 1 wherein each channel has an angled wall extending outwardly from a corresponding base portion.

3. The wire of claim 2 wherein the angled walls each have an angle orientation relative to a common axis and wherein each angle orientation is identical.

4. The wire of claim 2 wherein the angled walls each have an angle orientation relative to the longitudinal axis and wherein a first angle orientation of a first angled wall is opposite a second angle orientation of a second angled wall.

5. The wire of claim 1 wherein the pair of channels are parallel.

6. The wire of claim 1 wherein the divider has opposing walls extending outwardly from corresponding base portions of the pair of channels and angled such that the opposing walls converge and terminate at distal ends wherein a first engagement surface is formed therebetween.

7. The wire of claim 6 wherein the first engagement surface has a substantially planar profile.

8. The wire of claim 1 further comprising a pair of diverging walls separated by the pair of channels and the divider, the diverging walls each extending outwardly from corresponding base portions of each of the pair of channels and angled such that a first distance between the diverging walls adjacent the corresponding base portions is less than a second distance between the diverging walls at corresponding terminal ends of the diverging walls opposite the corresponding base portions.

9. The wire of claim 1 wherein the wire is substantially E-shaped when viewed in cross-section taken transverse to a circumference of the wire.

10. A wire for use in a brazing or soldering operation, the wire comprising:

a ring formed from a metallic material, the ring having a first end and a second end and is centered about a longitudinal axis;

a pair of substantially parallel channels extending along an inner circumference of the ring perpendicular to the longitudinal axis of the ring, each channel having an opening formed along the circumference of the ring facing the longitudinal axis of the ring;

a divider formed by a portion of the ring separating the pair of channels, the divider having opposing planar walls extending outwardly from corresponding co-planar base portions of the pair of channels and angled such that the opposing planar walls converge and terminate at distal ends wherein a first engagement surface is formed therebetween having a substantially planar profile;

a pair of diverging planar walls separated by the pair of channels and the divider, the diverging planar walls each extending outwardly from corresponding base portions of each of the pair of channels and angled such that a first distance between the diverging planar walls adjacent the corresponding base portions is less than a second distance between the diverging planar walls at corresponding terminal ends of the diverging planar walls opposite the corresponding base portions;

a second engagement surface formed between an outer surface of the elongated wire and the terminal end of one of the diverging planar walls having a substantially planar profile substantially coplanar with the first engagement surface;

a third engagement surface formed between the outer surface of the elongated wire and the terminal end of the other of the diverging planar walls having a substantially planar profile substantially coplanar with the second engagement surface; and a cured flux solution formed by curing a flux solution comprising a polymer-based binder material and a flux material within the pair of channels, wherein corresponding surfaces of the cured flux solution are exposed through the opening in each channel, wherein the cured flux solution within the channels forms a portion of an inner wall of the ring, and wherein the cured flux solution within a first channel is located below a plane extending from the terminal end of one of the diverging walls to the distal end of one of the opposing walls of the divider, and the cured flux solution within a second channel is located below a plane extending from the terminal end of the other of the diverging walls to the distal end of the other of the opposing walls of the divider.

11. A wire for use in a brazing or soldering operation, the wire comprising:

a ring formed from a metallic material, the ring having a first end and a second end and is centered about a longitudinal axis, the ring having a generally E-shaped cross-sectional profile wherein the ring includes:

a first channel extending along an inner circumference of the ring from the first end to the second end perpendicular to the longitudinal axis of the ring having a first planar channel base, an inner planar wall extending from a first side of the first planar channel base to a first opening facing the longitudinal axis of the ring, a second planar wall extending from a second side of the first planar channel base to the first opening;

a second channel extending along an inner circumference of the ring from the first end to the second end perpendicular to the longitudinal axis of the ring, having a second planar channel base, a first planar wall extending from a first side of the second planar channel base to a second opening facing the longitudinal axis of the ring, a second planar wall extending from a second side of the second planar channel base to the second opening, wherein the first planar channel base is co-planar with the second planar channel base; and, a cured flux solution within the first channel and the second channel.

12. The wire of claim 11 wherein the first opening has a width greater than a width of the first channel base and the second opening has a width greater than a width of the second channel base.

* * * * *